(12) United States Patent
Huth et al.

(10) Patent No.: US 10,259,056 B2
(45) Date of Patent: Apr. 16, 2019

(54) MILLING TOOL FOR AN ANGLE GRINDERS (71) Applicant: PFERD Milwaukee Brush Company, Inc., Milwaukee, WI (US)

(72) Inventors: Nicolas Huth, Lindlar (DE); Tobias Janßen, Wipperfürth (DE)

(73) Assignee: PEERD MILWAUKEE BRUSH COMPANY, INC., Milwaukee, WI (US)

( * ) Notice: Subject to any disclaimer, the term of this patent is extended or adjusted under 35 U.S.C. 154(b) by 183 days.

(21) Appl. No.: 15/309,617

(22) PCT Filed: Feb. 3, 2015

(86) PCT No.: PCT/EP2015/052144
§ 371 (c)(1),
(2) Date: Nov. 8, 2016

(87) PCT Pub. No.: WO2016/124221
PCT Pub. Date: Aug. 11, 2016

(65) Prior Publication Data
US 2017/0182568 A1   Jun. 29, 2017

(51) Int. Cl.
*B23C 5/08* (2006.01)
*B23C 5/20* (2006.01)
*B23C 5/00* (2006.01)
*B27G 13/00* (2006.01)
*B27G 13/10* (2006.01)
(Continued)

(52) U.S. Cl.
CPC .............. *B23C 5/202* (2013.01); *B23C 5/006* (2013.01); *B23C 5/08* (2013.01); *B23C 5/207* (2013.01); *B23C 5/2213* (2013.01); *B23F 21/146* (2013.01); *B24B 23/005* (2013.01); *B24B 23/028* (2013.01); *B27G 13/00* (2013.01); *B27G 13/10* (2013.01); *B23C 5/22* (2013.01); *B23C 5/2204* (2013.01); *B23C 5/2208* (2013.01); *B23C 2200/045* (2013.01); *B23C 2210/0421* (2013.01); *B23C 2210/0428* (2013.01);
(Continued)

(58) Field of Classification Search
CPC . B27G 13/08; B23C 2226/37; B23C 2226/61; B23C 2210/244; B23C 5/08; B23C 5/006; B23C 2210/0421; B23F 21/143; B23F 21/14
See application file for complete search history.

(56) References Cited

U.S. PATENT DOCUMENTS 3,371,397 A   3/1968 Coleshill et al.
4,850,407 A   7/1989 Inkster et al.
(Continued)

FOREIGN PATENT DOCUMENTS

DE   19929201 C1   1/2001
EP   0292246 B1   9/1995
(Continued)

*Primary Examiner* — Alan Snyder
(74) *Attorney, Agent, or Firm* — Browdy and Neimark, PLLC (57) ABSTRACT

A milling tool for an angle grinder has a supporting body, in the shape of a disk and able to be rotationally driven in a direction of rotation, which has an upper side and an underside. The supporting body is formed as a composite body of fiber-reinforced plastic. Cutting element chambers are formed in the supporting body, open to underside, in each of which one cutting element is replaceably arranged.

16 Claims, 7 Drawing Sheets

(51) Int. Cl.
    *B24B 23/00*     (2006.01)
    *B24B 23/02*     (2006.01)
    *B23C 5/22*     (2006.01)
    *B23F 21/14*     (2006.01)
    *B23F 21/12*     (2006.01)

(52) U.S. Cl.
    CPC ........... *B23C 2226/61* (2013.01); *B23F 21/12* (2013.01); *B23F 21/14* (2013.01); *B23F 21/143* (2013.01)

(56) References Cited

U.S. PATENT DOCUMENTS

| | | | |
|---|---|---|---|
| 5,605,420 A | | 2/1997 | Feldsine |
| 5,752,876 A | * | 5/1998 | Hettes ................... B24B 45/006 |
| | | | 451/463 |
| 6,945,863 B1 | * | 9/2005 | Hettes ................... B24D 13/16 |
| | | | 451/490 |
| 2007/0140799 A1 | | 6/2007 | Kumakiri et al. |
| 2013/0118642 A1 | * | 5/2013 | Inkster ................... B27G 13/10 |
| | | | 144/230 |
| 2014/0010606 A1 | | 1/2014 | Saagstroem et al. |
| 2015/0104262 A1 | * | 4/2015 | Endres ..................... B23C 5/06 |
| | | | 407/56 |

FOREIGN PATENT DOCUMENTS

| | | |
|---|---|---|
| EP | 1698417 A1 | 9/2006 |
| FR | 953994 A | 12/1949 |
| FR | 1532867 A | 7/1968 |
| FR | 2918909 A1 | 1/2009 |

\* cited by examiner

MILLING TOOL FOR AN ANGLE GRINDERS

FIELD OF THE INVENTION

The invention relates to a milling tool for an angle grinder, with a supporting body, which
- is made in the shape of a disk and can be rotationally driven in a direction of rotation,
- has an opening coaxial to a central axis of rotation for accommodating a rotationally driven spindle of an angle grinder, and
- has an upper side and an underside with a number n of cutting elements, which
- are arranged in the outer area of the supporting body radially to the axis of rotation, and
- each has a cutting edge, which
  - protrudes beyond the underside of the supporting body.

BACKGROUND OF THE INVENTION

Such a cutting edge, known from EP 0 292 264 B1 (corresponding to DE 38 54 408 T2), is made of steel in a single piece and has cutting teeth protruding radially beyond an outer periphery and in the direction of its longitudinal axis. This tool is designed for machining wood and is furthermore only suitable for that.

Another milling tool of the generic type is known from DE 199 29 201 C1, in which a set of cutting teeth worked in a single piece from a hard metal ring is attached to a steel support. This milling tool is suitable for machining any materials that are no harder than the material of the cutting elements, both on fixed machines and on angle grinders.

A milling tool is known from U.S. 2014/0010606 A1, which has a disk-shaped supporting body with radially protruding and replaceable cutting elements at the outer periphery. This milling tool is designed for cutting slots in workpieces.

SUMMARY OF THE INVENTION

It is an object of the invention to configure a milling tool for an angle grinder such that it is versatile and easy to handle.

This object is achieved according to the invention in that the supporting body is formed as a composite body of fibre-reinforced plastic and in that cutting element chambers are formed in the supporting body, open to the underside of the supporting body, in each of which cutting element chambers one cutting element is replaceably arranged, and in that the supporting body consists of a number m of glass fibre fabric plies coated with epoxy resin, whereby for the number m of plies: $30 \leq m \leq 80$ applies. Through the measures according to the invention, the milling tool achieves a low weight that corresponds to that of a conventional grinding disk for the same application in an angle grinder. Due to the replaceability of the cutting elements, different cutting elements can be used to machine different materials. An optimised setting of the cutting edges of the cutting elements can furthermore be achieved through the method of fitting the cutting elements to the supporting body. Since the cutting elements are replaceable, the supporting body can be used, in principle, for any length of time.

According to an advantageous further development, if the cutting elements are made in the shape of a ring and each lying with a rear side against a contact surface of a cutting element chamber, the cutting elements can be made to be re-usable following partial wear of the cutting edge by turning them. They can furthermore be removed and reground or replaced by other types of cutting element.

It is particularly easy to turn the cutting elements and to replace them if, according to another advantageous embodiment of the invention, the cutting elements are each fastened and centred with a fastening screw to the supporting body.

A particularly simple fastening of the cutting elements to the supporting body is obtained if a bore is made in the supporting body from each cutting element chamber, with a fastening sleeve arranged in the bore, into which sleeve a fastening screw holding a cutting element is screwed. In this case, it is advantageous if the fastening sleeve has an external thread engaging in the supporting body and an internal thread accommodating the fastening screw, whereby these threads can work in opposite directions, which makes it possible to obtain a particularly firm clamping of the cutting elements in the supporting body.

In a particularly simple manner, the cutting elements can be formed in the shape of a ring with a fastener opening coaxial to a centreline axis and a lateral surface in the shape of a truncated cone forming a relief surface and a front side forming a cutting surface. In this case, it is advantageous if, between the relief surface of the cutting element and a line parallel to its centreline, a clearance angle $\gamma$ is formed for which: $0° \leq \gamma \leq 20°$ applies, and preferably $5° \leq \gamma \leq 15°$. This clearance angle $\gamma$ is the clearance angle of the cutting element. The effective clearance angle when using the milling tool depends in contrast on the arrangement of the cutting element on the supporting body.

It is furthermore advantageous if each cutting element is arranged in a cutting element chamber at a negative effective cutting angle $\beta$, whereby for effective cutting angle $\beta$: $0° \leq \beta \leq 40°$ applies, and preferably $\beta = 30°$. This embodiment leads to a relatively soft cut being obtained.

According to another advantageous embodiment of the invention, if each cutting element is arranged in a cutting element chamber at a twist angle $\alpha$, the chips are ejected such that any injury to the operator is impossible. For the twist angle in this case: $10° \leq \alpha \leq 40°$ and preferably $\alpha = 30°$.

Since angle grinder milling tools according to the invention are used at an angle to the workpiece, it is advantageous if the supporting body has an outer peripheral surface between the upper side and the underside and if the cutting elements protrude radially beyond this outer peripheral surface.

It is advantageous if the cutting elements consist of a cutting material, for which hard metals with grain sizes from 0.2 μm to 10 μm, ceramic, hard metals with a coating, e.g. a diamond coating, polycrystalline boron nitride (PCBN), polycrystalline diamond (PCD) or High Speed Steel (HSS) are suitable.

It is furthermore advantageous if the supporting body is made from epoxy resin or phenol resin or polyester resin or polyurethane resin and from glass fibres and/or carbon fibres and/or aramide fibres and/or natural fibres. Hemp, sisal or similar fibres come into question as natural fibres.

It is furthermore advantageous if for the number m of glass fibre fabric plies coated with epoxy resin m=60 applies. In this case, the resin portion is advantageously 30% to 55% of the total weight of the coated glass fibre fabric plies. The weight of the glass fibre fabric plies is in the range from 150 gsm to 250 gsm.

It is furthermore advantageous if a number n of cutting elements is arranged on the supporting body at equal angular distances, whereby for the number n of cutting elements:

$2<=n<=20$ applies and preferably $5<=n<=10$. The number n can be chosen such that the vibration of the milling tool is minimised during use, which makes it considerably easier to use for the operator. The cutting elements can be arranged on the supporting body at equal angular distances. However, in order to reduce vibration, it can also be advantageous if unequal angular distances are chosen.

Further advantages, details and features of the invention emerge from the following description of an embodiment with the aid of the drawing.

DESCRIPTION OF THE PREFERRED EMBODIMENT

Figure 9:
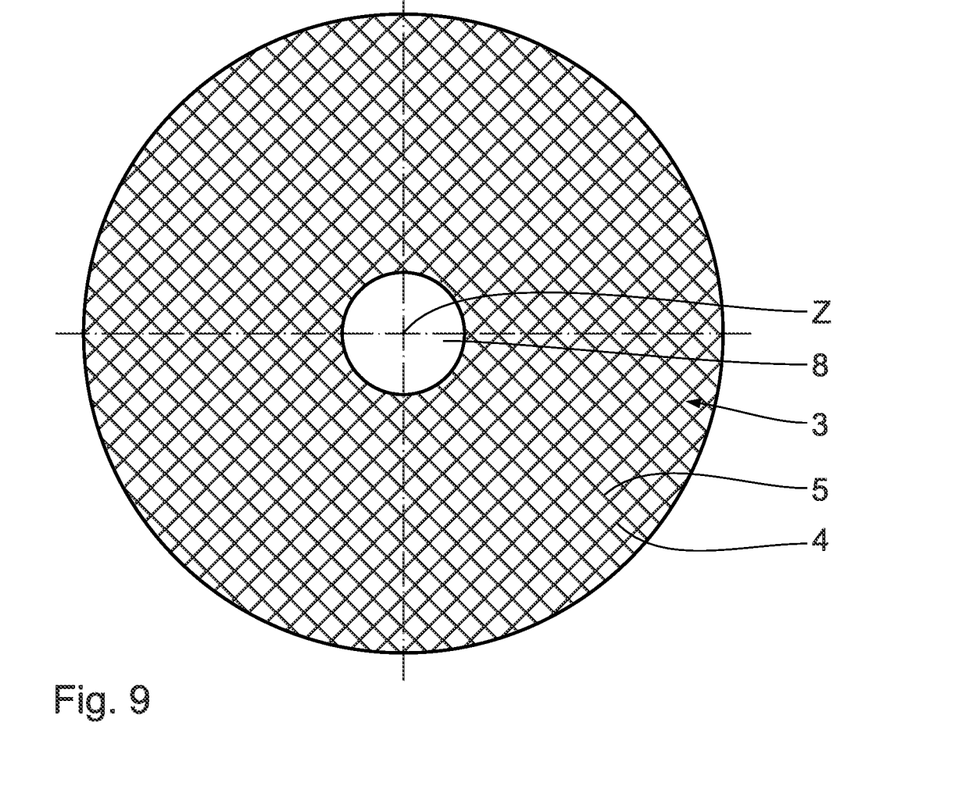
FIG. 9 shows a plan view of a glass fibre fabric.

The milling tool for an angle grinder represented in the drawing has a disk-shaped supporting body 1 and a number n of cutting elements 2 identical to each other fastened to it. Supporting body 1 is not constructed in one piece, but consists of a number m of glass fibre fabric plies 3 coated with epoxy resin, so-called prepregs. These glass fibre fabric plies 3 made from warp yarn 4 and weft yarn 5 according to FIG. 9, twisted against each other around an axis of rotation Z, are laid up one on top of the other and bonded together in a mould under pressure and at an appropriate temperature. Due to the fact that individual glass fibre fabric plies 3 are twisted against each other, the supporting body achieves a high strength value, virtually equal in all directions, so that a spontaneous fracture of supporting body 1 during operation, and hence at high r.p.m values, is impossible.

Supporting body 1 is formed with an offset, hence provided in its central area with an area rotationally symmetrical to axis of rotation Z having an offset 6, which protrudes from the upper side 7 of the supporting body 1. An opening 8, also coaxial with axis of rotation Z, is formed in offset 6, this opening accommodating a spindle of an angle grinder, brief details of which will be given further below.

In underside 9 opposite upper side 7, and in fact in the area of outer peripheral surface 10 of disk-shaped supporting body 1, cutting element chambers 11 made by milling are open to underside 9 and to outer peripheral surface 10. Cutting element chambers 11 have a contact surface 12 for cutting elements 2. Contact surface 12 is penetrated by a bore 13 leading to upper side 7, with centreline 14 of bore 13 being arranged perpendicular to contact surface 12. In bore 13, a fastening sleeve 17 is arranged, provided with an external thread 15 and an internal thread 16 and screwed into bore 13 of supporting body 1. External thread 15 and internal thread 16 can be formed to work in the same direction or in opposite directions. A cutting element 2 is fastened and centred with a fastening screw 18 to fastening sleeve 17. Centreline 14 is also the centreline of fastening screw 18 and cutting element 2. Cutting element 2 formed in the shape of a truncated cone lies with its rear side 19 pressed against contact surface 12, which precisely determines the position of cutting element 2 relative to supporting body 1.

The front side of each cutting element 2 opposite rear side 19 forms its cutting surface 20. The outer peripheral surface in the shape of a truncated cone of cutting element 2 concerned forms its relief surface 21. The edge formed between cutting surface 20 and relief surface 21 forms cutting edge 22 of cutting element 2 concerned. Cutting element 2 has its largest diameter d in the area of cutting edge 22.

After loosening fastening screw 18 passing through fastening opening 23 coaxial with centreline 14, the cutting element 2 concerned can be turned around centreline 14, so that different parts of cutting edge 22 can be brought into use until totally worn. Replacement of cutting elements 2 is also possible in a simple manner.

Figures 4, 5:
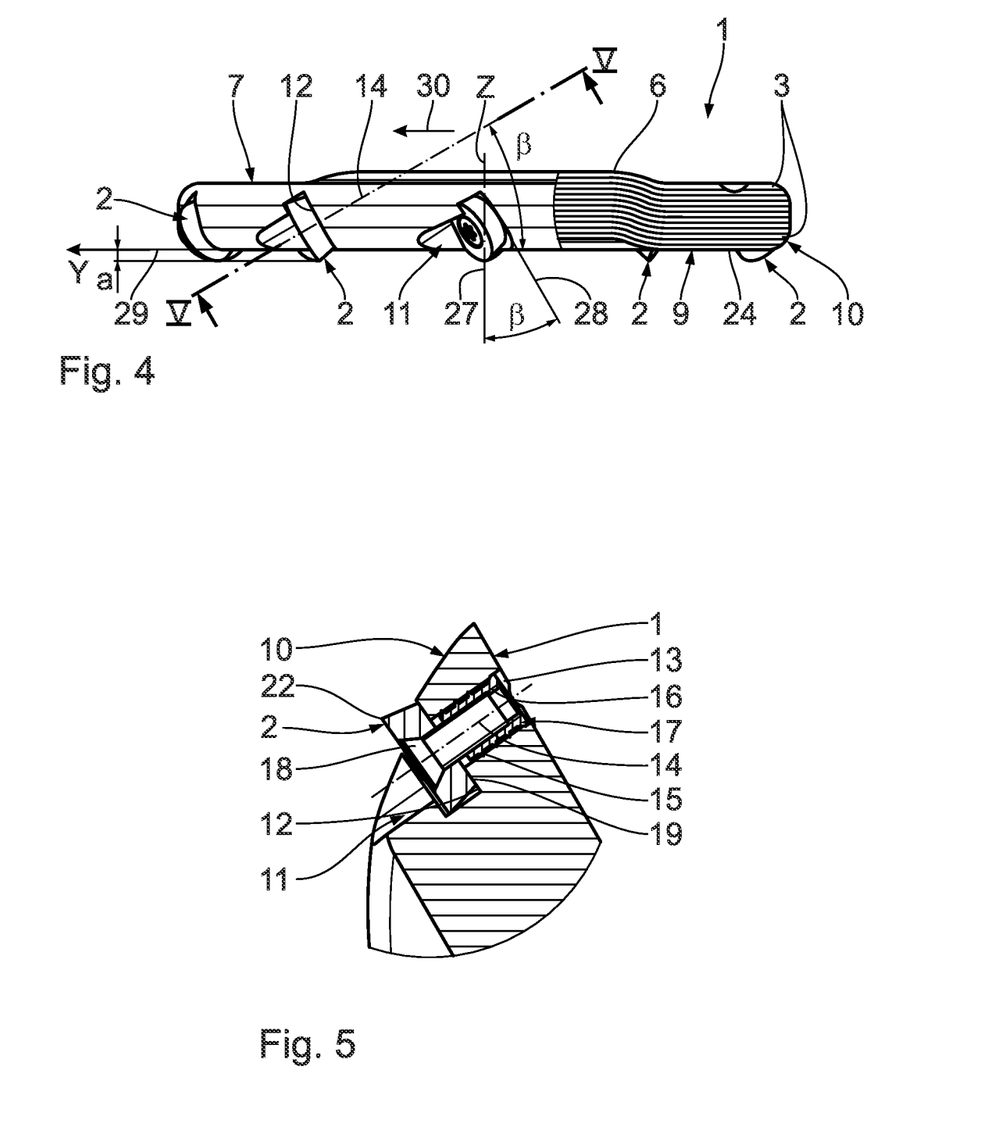
FIG. 4 shows a side view of the milling tool according to FIGS. 1 to 3 corresponding to viewing arrow IV in FIG. 3, in a partially exploded representation.
FIG. 5 shows a partial section through the milling tool corresponding to intersecting line V-V in FIG. 4, in a magnified representation compared with FIG. 4.
Figure 6:
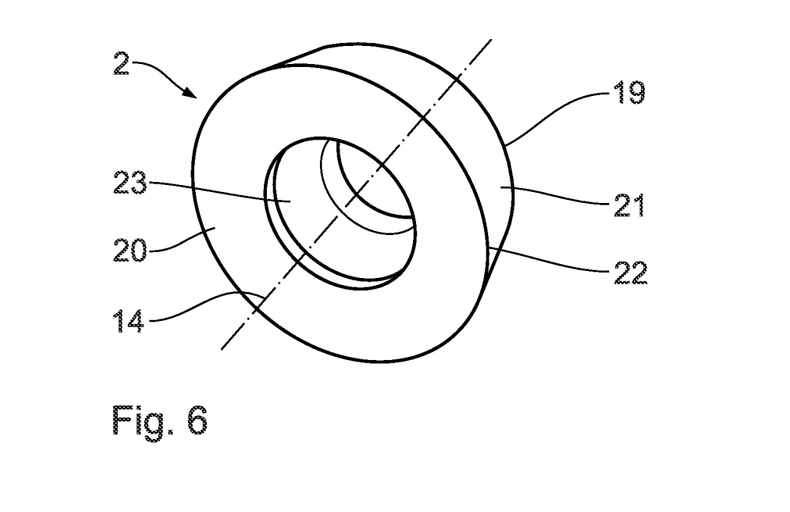
FIG. 6 shows a perspective view of a cutting element of the milling tool.
Figure 7:
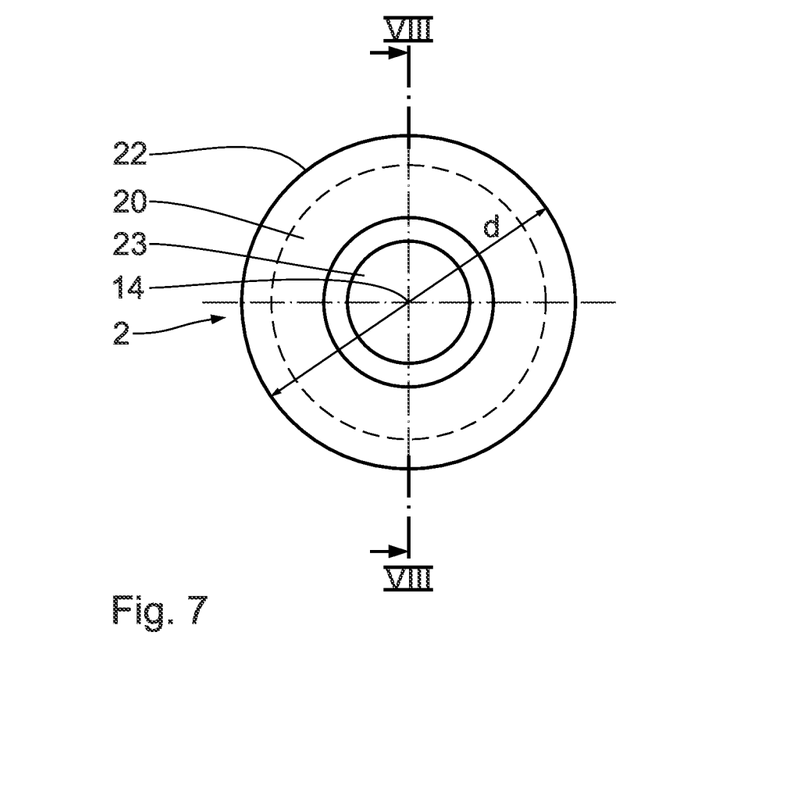
FIG. 7 shows a plan view of the cutting element according to FIG. 6.

As especially visible in FIGS. 4 and 5, rear side 19 of each cutting element 2 does not protrude beyond outer peripheral surface 10 of supporting body 1, but is virtually flush with it. In contrast, each cutting element 2 protrudes, with a part respectively of its cutting edge 22, its relief surface 21 and its cutting surface 20, beyond outer peripheral surface 10 and underside 9, whereby the ring-shaped area of underside 9 near cutting element 2 radial to axis of rotation Z acts as a depth-limiting surface 24. The cutting edge 22 concerned protrudes beyond this depth limiting surface 24 by a cutting depth a, which determines the maximum thickness of metal to be cut.

Figure 8:
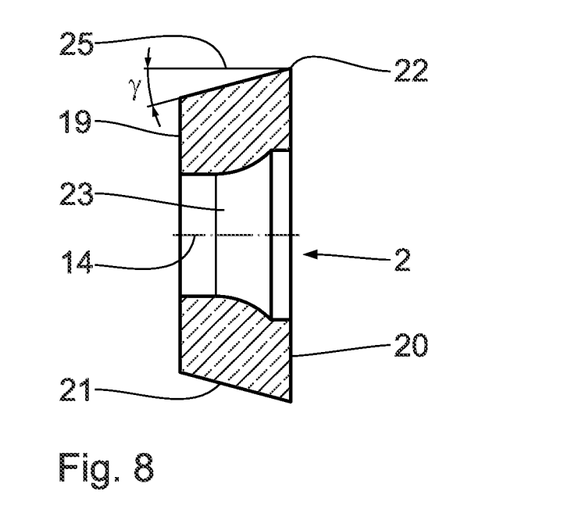
FIG. 8 shows a cross-section through the cutting element corresponding to intersecting line VIII-VIII in FIG. 7.

Clearance angle $\gamma$ of cutting element 2 is formed between relief surface 21 and a line 25 parallel to centreline 14 (FIG. 8).

An effective cutting angle $\beta$ is formed between a line 27 parallel to axis of rotation Z and a line 28 radial to centreline 14 of the cutting element 2 concerned. Effective cutting angle $\beta$ is also correspondingly defined by a Y axis 29 running perpendicular to axis of rotation Z and centreline 14. Both representations can be seen in FIG. 4. As FIG. 4 also shows, effective cutting angle $\beta$ is negative.

Figure 1:
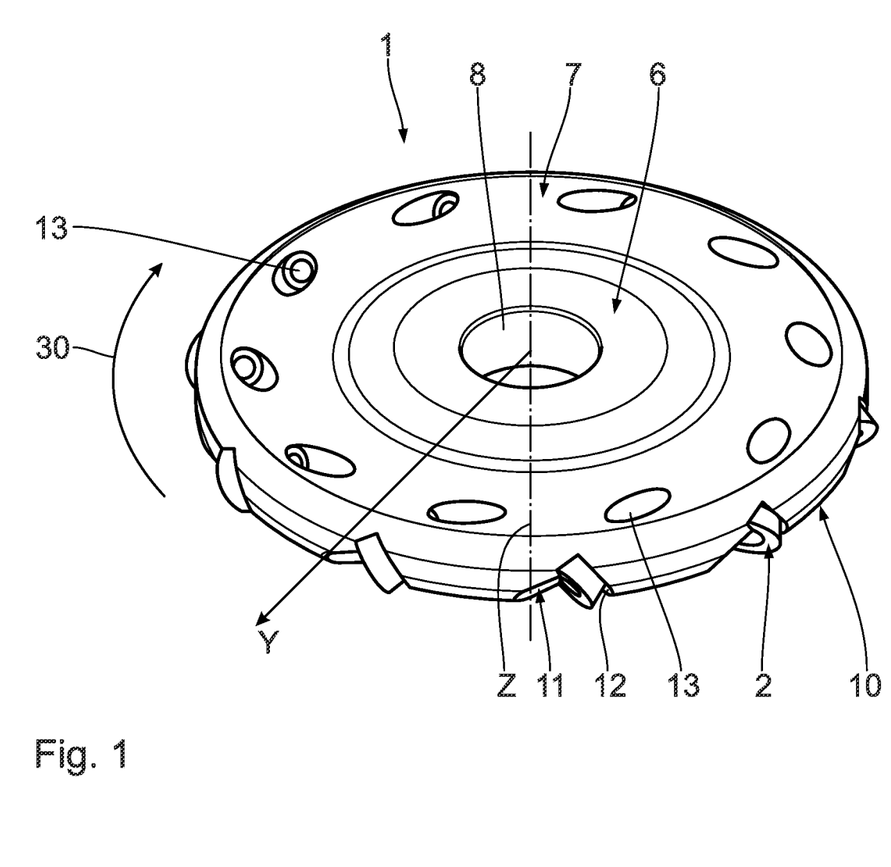
FIG. 1 shows a perspective view of the upper side of the milling tool.
Figure 2:
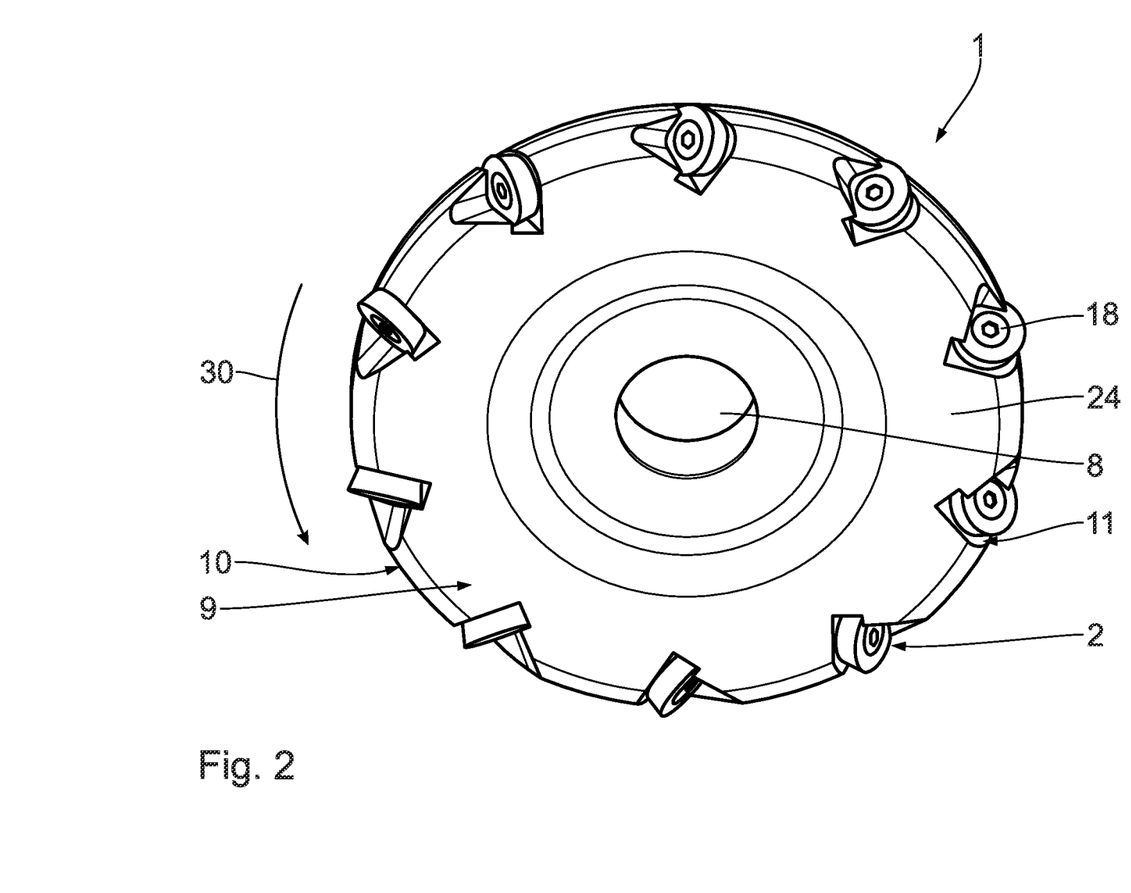
FIG. 2 shows a perspective view of the underside of the milling tool according to FIG. 1.
Figure 3:
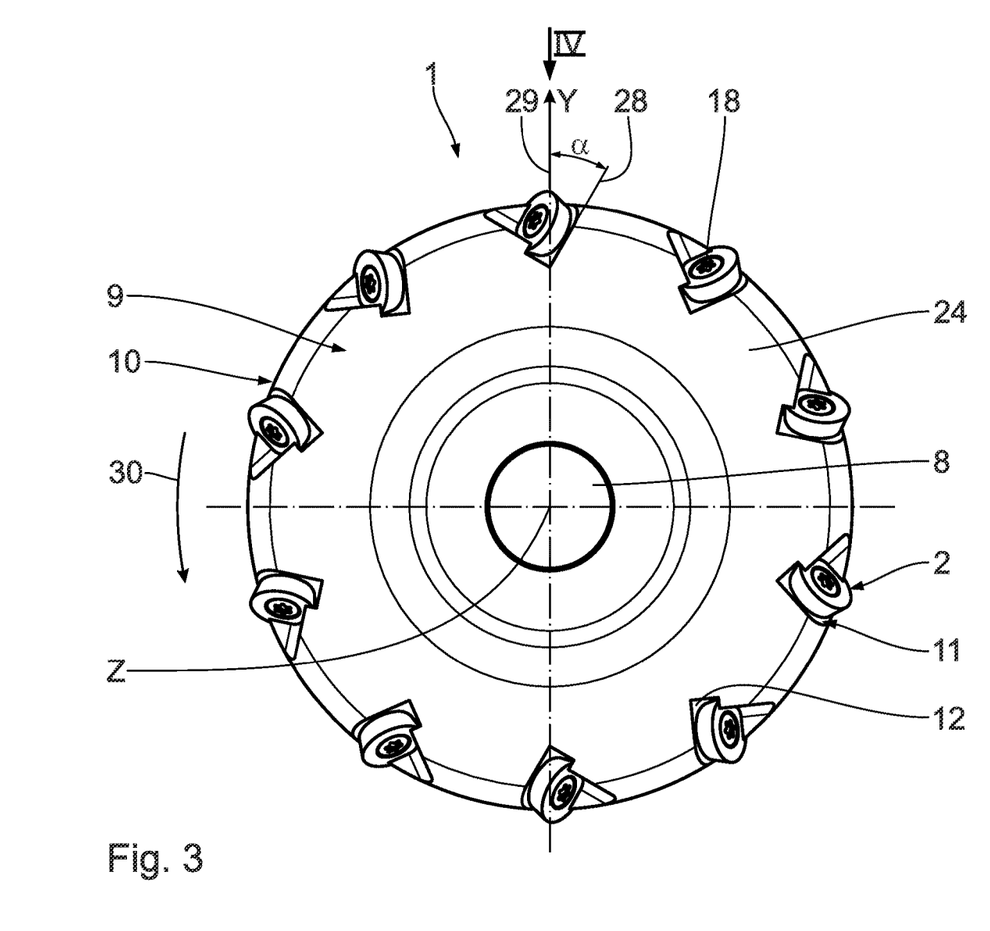
FIG. 3 shows a plan view of the underside of the milling tool according to FIG. 1 and FIG. 2.

Finally, cutting element 2 is also still arranged at a twist angle $\alpha$ (FIG. 3) relative to supporting body 1. This twist angle $\alpha$ is formed between a Y axis 29 perpendicular to axis of rotation Z and a radial line 28 perpendicular to centreline 14. As shown in FIGS. 2, 3 and 4, the effect of arranging the cutting element 2 concerned at a twist angle $\alpha$ is that chips cut when driving the milling tool in direction of rotation 30 radially to axis of rotation Z are ejected outwards, therefore away from the area of supporting body 1.

Effective cutting angle $\beta$ and twist angle $\alpha$ result from the arrangement of cutting element 2 on the supporting body.

The following ranges apply to the data dealt with above:

50 mm$<=$D$<=$230 mm, preferably D=100 mm or 115 mm or 125 mm 6 mm$<=$d$<=$20 mm $0°<=\beta<=40°$, preferably $\beta=30°$ (Effective cutting angle $\beta$ is negative).

Figure 10:
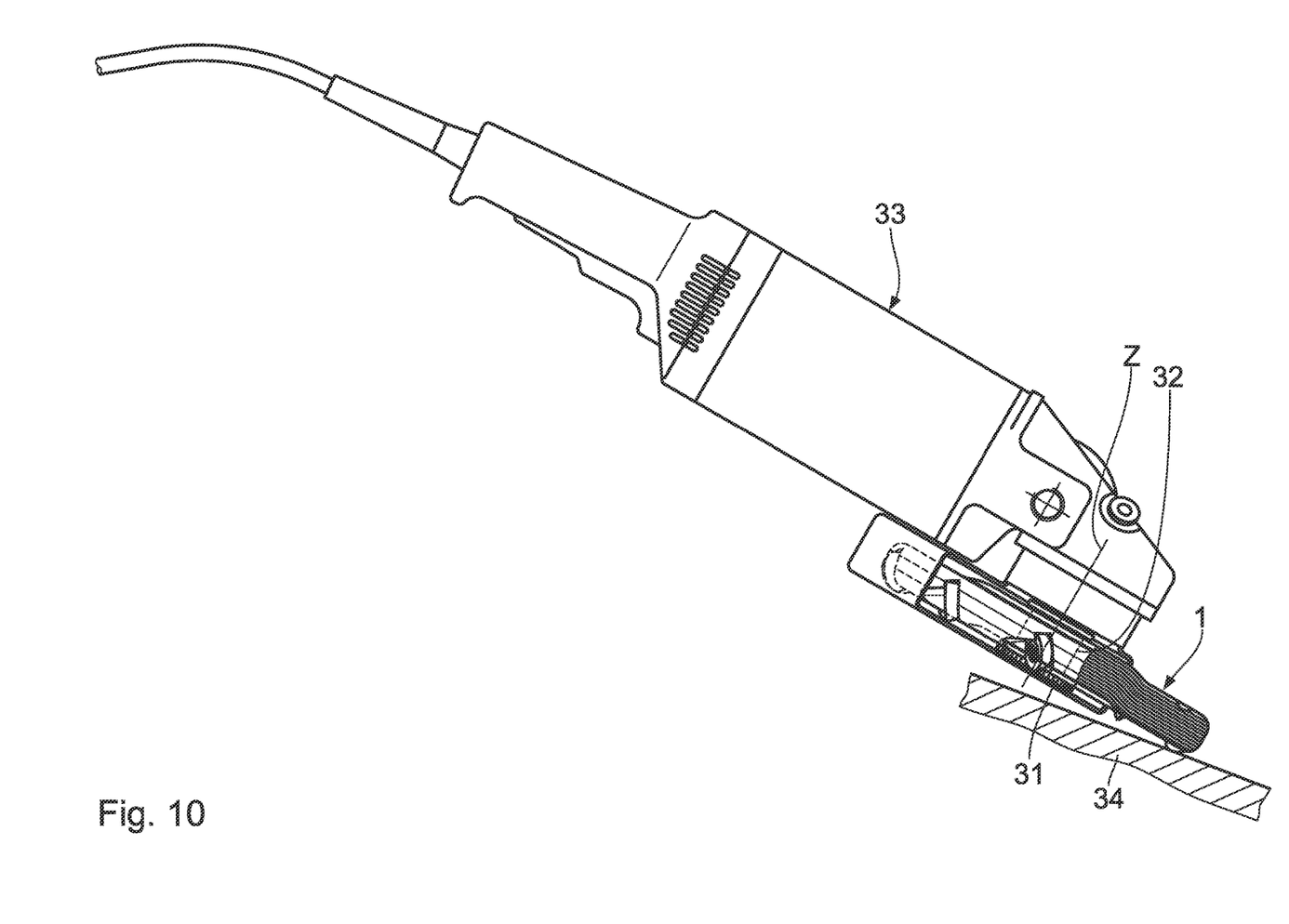
FIG. 10 shows an angle grinder with a milling tool according to FIGS. 1 to 4.

$10°<=\alpha<=40°$, preferably $\alpha=30°$ $0° \leq \gamma \leq 20°$, preferably $5° \leq \gamma \leq 15°$
$2 \leq n \leq 20$, preferably $5 \leq n \leq 12$
$30 \leq m \leq 80$, preferably $m=60$ The use of the milling tool on an angle grinder is represented on FIG. 10. According to this, a milling tool is fitted by means of a fastening nut 31 to be rotationally driven around axis of rotation Z on rotationally driven spindle 32 of an angle grinder 33, a so-called power tool, and is used to machine a workpiece 34 at a shallow angle. This uses the part protruding beyond underside 9 of supporting body 1 and the part of cutting edge 22 concerned protruding beyond outer peripheral surface 10. The principal function is that of a face cutting edge.

The invention claimed is:

1. A milling tool for an angle grinder, the milling tool comprising:
   a disk-shaped supporting body
   rotationally drivable in a direction of rotation, the disk-shaped supporting body comprising a composite body of fibre-reinforced plastic, and
   the disk shaped supporting body defining an opening coaxial to a central axis of rotation for accommodating a rotationally driven spindle of an angle grinder, and
   having an upper side and an underside,
   number n of cutting
   elements arranged in an outer area of the supporting body radially with respect to the central axis of rotation,
   each of the cutting elements having a cutting edge,
   cutting element chambers defined in the supporting body, open to an underside of the supporting body, each cutting element chamber having a cutting element replaceably arranged therein such that the cutting edge protrudes beyond the underside of the supporting body,
   wherein the supporting body consists of a number m of fibre fabric plies coated with resin, whereby for the number m of plies: $30 \leq m \leq 80$ applies,
   wherein, proceeding from each cutting element chamber and leading to an upper side of the supporting body, a bore is formed in the supporting body, a fastening sleeve is arranged in the bore, and a fastening screw holding a cutting element is screwed into the fastening sleeve, and
   wherein the supporting body has an outer peripheral surface between the underside and the upper side and wherein the cutting elements protrude radially beyond this outer peripheral surface.

2. The milling tool according to claim 1, wherein the cutting elements have the shape of a ring and each lay with a rear side against a contact surface of one of the cutting element chambers.

3. The milling tool according to claim 1, wherein the fastening sleeve has an external thread engaging in the supporting body and an internal thread accommodating the fastening screw.

4. The milling tool according to claim 1, wherein the cutting elements ring-shaped having a center axis and each cutting element has a fastener opening coaxial to center axis of the cutting element and a lateral surface in the shape of a truncated cone forming a relief surface and a front side forming a cutting surface.

5. The milling tool according to claim 4, wherein between the relief surface of the cutting element and a line parallel to the centreline, a clearance angle $\gamma$ is formed for which: $5° \leq \gamma \leq 15°$ applies.

6. The milling tool according to claim 4, wherein between the relief surface of the cutting element and a line parallel to the center axis, a clearance angle $\gamma$ is formed for which: $0° \leq \gamma \leq 20°$ applies.

7. The milling tool according to claim 1, wherein the cutting elements are each arranged in the cutting element chambers at a negative effective cutting angle $\beta$, whereby for the effective cutting angle $\beta$: $0° \leq \beta \leq 40°$ applies.

8. The milling tool according to claim 7, wherein for the effective cutting angle $\beta$: $\beta=30°$ applies.

9. The milling tool according to claim 1, wherein the cutting elements are each arranged one of the cutting element chambers at a twist angle $\alpha$, for which: $10° \leq \alpha \leq 40°$ applies.

10. The milling tool according to claim 9, wherein for the twist angle $\alpha$: $\alpha=30°$ applies.

11. The milling tool according to claim 1, wherein the cutting elements consist of a cutting material.

12. The milling tool according to claim 1, wherein the supporting body is made from one of epoxy resin and phenol resin and polyester resin and polyurethane resin and at least one of glass fibres, carbon fibres and aramide fibres and natural fibres.

13. The milling tool according to claim 1, wherein for the number m applies $m=60$.

14. The milling tool according to claim 1, wherein the cutting elements are arrangeable on the supporting body at equal angular distances, whereby for the number n of cutting elements: $2 \leq n \leq 20$ applies.

15. The milling tool according to claim 14, wherein for the number n of cutting elements: $5 \leq n \leq 12$ applies.

16. The milling tool according to claim 1, wherein the glass fibre fabric plies each comprise warp yarn and weft yarn twisted against each other around an axis of rotation.

* * * * *